(12) United States Patent
Zebra et al.

(10) Patent No.: US 12,515,491 B2
(45) Date of Patent: Jan. 6, 2026

(54) ELECTRICAL APPARATUS

(71) Applicant: THERMO KING LLC, Minneapolis, MN (US)

(72) Inventors: Frantisek Zebra, Necin (CZ); Josef Malek, Prague (CZ); Jonas Kubat, Prague (CZ); Esteban Canade Tarquini, Barcelona (ES); Andreu Vidal Clos, Lleida (ES); Alessandro Silvestri, Barcelona (ES); Ryan Wayne Schumacher, Bloomington, MN (US)

(73) Assignee: Thermo King LLC, Minneapolis, MN (US)

( * ) Notice: Subject to any disclaimer, the term of this patent is extended or adjusted under 35 U.S.C. 154(b) by 201 days.

(21) Appl. No.: 18/392,160

(22) Filed: Dec. 21, 2023

(65) Prior Publication Data

US 2024/0208292 A1 Jun. 27, 2024

(30) Foreign Application Priority Data

Dec. 22, 2022 (EP) .................................... 22216185

(51) Int. Cl.
*B60H 1/00* (2006.01)
*B60H 1/32* (2006.01)
(Continued)

(52) U.S. Cl.
CPC ...... *B60H 1/00428* (2013.01); *H02M 1/0067* (2021.05); *H02M 1/327* (2021.05); *H02P 27/06* (2013.01); *B60H 1/3232* (2013.01)

(58) Field of Classification Search
CPC ... B60H 1/00428; B60H 1/3232; B60L 1/003; B60L 2200/36; B60L 2210/12;
(Continued)

(56) References Cited

U.S. PATENT DOCUMENTS

2016/0172992 A1 6/2016 Tallam et al.
2021/0359632 A1* 11/2021 Valasek .................. H02M 5/42

FOREIGN PATENT DOCUMENTS

CN 111669038 9/2020
EP 3910771 11/2021

OTHER PUBLICATIONS

Extended European Search Report, issued in the corresponding EP patent application No. 22216185.3, dated Jun. 27, 2023, 7 pages.

* cited by examiner

*Primary Examiner* — Antony M Paul
(74) *Attorney, Agent, or Firm* — HSML P.C.

(57) ABSTRACT

The present disclosure relates to an electrical apparatus comprising: an AC power module including a rectifier system; a DC bus configured to electrically couple the AC power module to a core power module including at least one DC electrical component; a pre-charge circuit; and a control system. The control system is configured to: responsive to a pre-charge initiation signal, perform a pre-charging procedure for pre-charging the DC bus, the pre-charging procedure including: activating the pre-charge circuit to provide a pre-charging current to the DC bus; monitoring a voltage on the DC bus; and responsive to a determination that the monitored voltage on the DC bus has reached a pre-charging threshold, perform a run procedure including: deactivating the pre-charge circuit; and electrically coupling the AC power module to an external AC power supply via an AC bus.

15 Claims, 3 Drawing Sheets

(51) Int. Cl.
*H02M 1/00* (2007.01)
*H02M 1/32* (2007.01)
*H02P 27/06* (2006.01)

(58) Field of Classification Search
CPC ........ B60L 2270/20; B60L 3/00; B60L 53/22;
H02J 1/06; H02M 1/0067; H02M 1/32;
H02M 1/36; H02M 1/0003; H02M 1/10;
H02P 27/06
See application file for complete search history.

ELECTRICAL APPARATUS

FIELD OF THE INVENTION

The present disclosure relates to an electrical apparatus and, in particular, to an electrical apparatus for a transport refrigeration system. The present disclosure also relates to a transport refrigeration system comprising an electrical apparatus.

BACKGROUND OF THE INVENTION

It is known for a transport refrigeration system (TRS) to include an electrical apparatus and at least one AC electrical load which requires a supply of AC electrical power for operation. When a TRS is not in transit, it may be that the electrical apparatus receives at least part of the required supply of AC electrical power for operation of the at least one AC electrical load from an external AC power supply such as a public or a private electrical grid (sometimes referred to as "shore power"). Otherwise, when the TRS is in transit, it may be that the at least part of the required supply of AC electrical power is supplied to the at least one AC electrical load from an internal DC power source (such as a battery) via a suitable inverter system.

In order to receive AC electrical power from the external AC power supply, the electrical apparatus may be electrically coupled to the external AC power supply at, for instance, an external connection port to which an external electrical cable is connected. An electrical current may then be drawn from the external AC power supply by the electrical apparatus for operating the at least one AC electrical load. However, in various conventional systems, there may be a risk that a relatively high current (sometimes referred to as "surge current") may arise within the electrical apparatus as the electrical current is initially drawn from the external AC power supply. In some conventional systems, a relatively large passive resistor may be used to limit the initial current drawn from the external AC power supply by the electrical apparatus and thereby reduce the risk of a current surge. However, this results in undesirable dissipation of energy as heat within the electrical apparatus. Additionally, the use of passive electrical components such as large resistors is associated with size and/or mass penalties. It is therefore desirable to provide an improved electrical apparatus which addresses these issues.

SUMMARY OF THE INVENTION

According to a first aspect, there is provided an electrical apparatus comprising: an AC power module including a rectifier system; a DC bus configured to electrically couple the AC power module to a core power module including at least one DC electrical component; a pre-charge circuit; and a control system, wherein the control system is configured to: responsive to a pre-charge initiation signal, perform a pre-charging procedure for pre-charging the DC bus, the pre-charging procedure including: activating the pre-charge circuit to provide a pre-charging current to the DC bus; monitoring a voltage on the DC bus; and responsive to a determination that the monitored voltage on the DC bus has reached a pre-charging threshold, perform a run procedure including: deactivating the pre-charge circuit; and electrically coupling the AC power module to an external AC power supply via an AC bus.

It may be the pre-charging current provided to the DC bus is for simultaneously pre-charging the AC power module and the core power module.

The external AC power supply may be an AC shore power supply. The pre-charge circuit may comprise a controllable current source. It may be that the AC power module comprises a filter including a capacitor.

It may be that pre-charging procedure further comprises checking for residual charge on the DC bus and discharging the DC bus if there is any residual charge on the DC bus before activating the pre-charge circuit to provide the pre-charging current to the DC bus.

The monitored voltage on the DC bus may be a potential difference between a first conductor of the DC bus and a second conductor of the DC bus.

The control system may be configured to: perform the run procedure responsive to: a determination that the monitored voltage on the DC bus has reached the pre-charging threshold; and a determination that a pre-determined time period has elapsed since the monitored voltage on the DC bus was determined to have reached the pre-charging threshold.

The pre-charging threshold may be between 70% and 90% of an operating voltage of the DC bus. The operating voltage of the DC bus may be between 400 V and 800 V.

It may be that activating the pre-charge circuit to provide the pre-charging current to the DC bus includes the pre-charge circuit providing the pre-charging current to the DC bus based on a reference voltage, and wherein the reference voltage is the monitored voltage on the DC bus.

It may also be that the pre-charge circuit providing the pre-charging current to the DC bus based on the reference voltage includes the pre-charge circuit increasing the pre-charging current provided to the DC bus in response to an increase in the reference voltage.

It may be that the electrical apparatus further comprises the core power module. Further, it may be that the at least one DC electrical component includes an inverter system. In addition or instead, the at least one DC electrical component may include a DC-DC converter system. The DC-DC converter system may be a buck DC-DC converter system. It may be that the core power module is electrically coupled to or selectively electrically couplable to a DC power supply. The DC power supply may be an electrical energy storage device such as a battery pack.

According to a second aspect, there is provided a transport refrigeration system comprising the electrical apparatus of the first aspect, wherein: the at least one DC electrical component includes an inverter system electrically coupled to at least one AC electrical load; and the at least one AC electrical load is an AC motor which is configured to drive a compressor, a pump or a fan of the transport refrigeration system.

According to a third aspect, there is provided a transport refrigeration system comprising the electrical apparatus of the first aspect, wherein: the at least one DC electrical component includes a DC-DC converter system electrically coupled to at least one DC electrical load; and the at least one DC electrical load is a DC motor which is configured to drive a compressor, a fan or a pump of the transport refrigeration system.

DETAILED DESCRIPTION

One aspect of the present disclosure relates to an electrical apparatus configured to supply electrical power to an AC electrical load of a transport refrigeration unit (TRU) from an external AC power supply when the TRU is not in transit.

More specifically, the present disclosure relates to a transport refrigeration system comprising a TRU and an electrical apparatus configured to supply electrical power to the AC electrical load of the TRU from an external AC power supply when the TRU is not in transit. An electrical current may be selectively drawn from the external AC power supply by the electrical apparatus for operating the AC electrical load. In general, there may be a risk that a surge current may arise within the electrical apparatus as the electrical current is initially drawn from the external AC power supply unless the electrical apparatus is provided with means for limiting the initial current drawn from an external AC power supply by the electrical apparatus for the purpose of current surge prevention and/or mitigation.

The TRU may generally be configured to cool and/or heat a climate controlled compartment. The climate-controlled compartment can take the form of multiple compartments or have multiple zones. Exemplary transport refrigeration systems include an over-the-road trailer, an over-the-road truck body, a bus, a transport container and a railway car.

Figure 1:
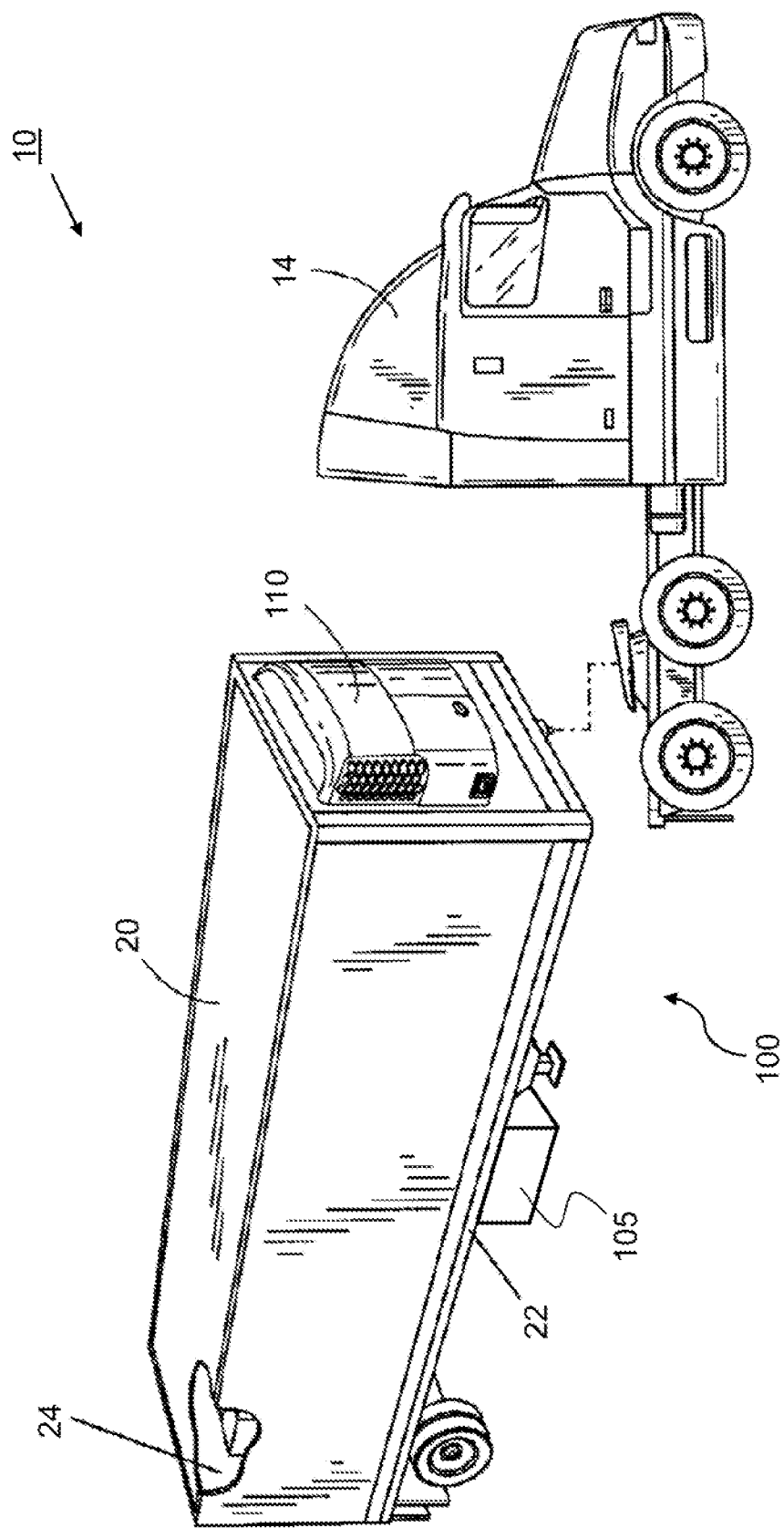
FIG. 1 shows a vehicle comprising a transport refrigeration system.

FIG. 1 shows a vehicle 10 comprising a transport refrigeration system 20. In the example of FIG. 1, the transport refrigeration system 20 is an over-the-road refrigerated semi-trailer 20 having a structure 22 supporting (or forming) a single climate-controlled compartment 24 which is configured to be cooled and/or heated by a TRU 110. The structure 22 includes a chassis. The vehicle 10 comprises an electrical apparatus 100 which includes various components disposed within an under-chassis box 105. In some examples, one or more components of the electrical apparatus 100 may be integrated or incorporated into the TRU 110. The structure 22 supports the TRU 110 and the under-chassis box 105. The vehicle 10 further comprises a tractor unit 14 removably couplable to the trailer 20. In other examples, the transport refrigeration system 20 may be, or may be part of, a temperature- or climate-controlled compartment of another type of vehicle such as, for instance, a truck which does not have a tractor unit which is removably couplable to a trailer.

Figure 2:
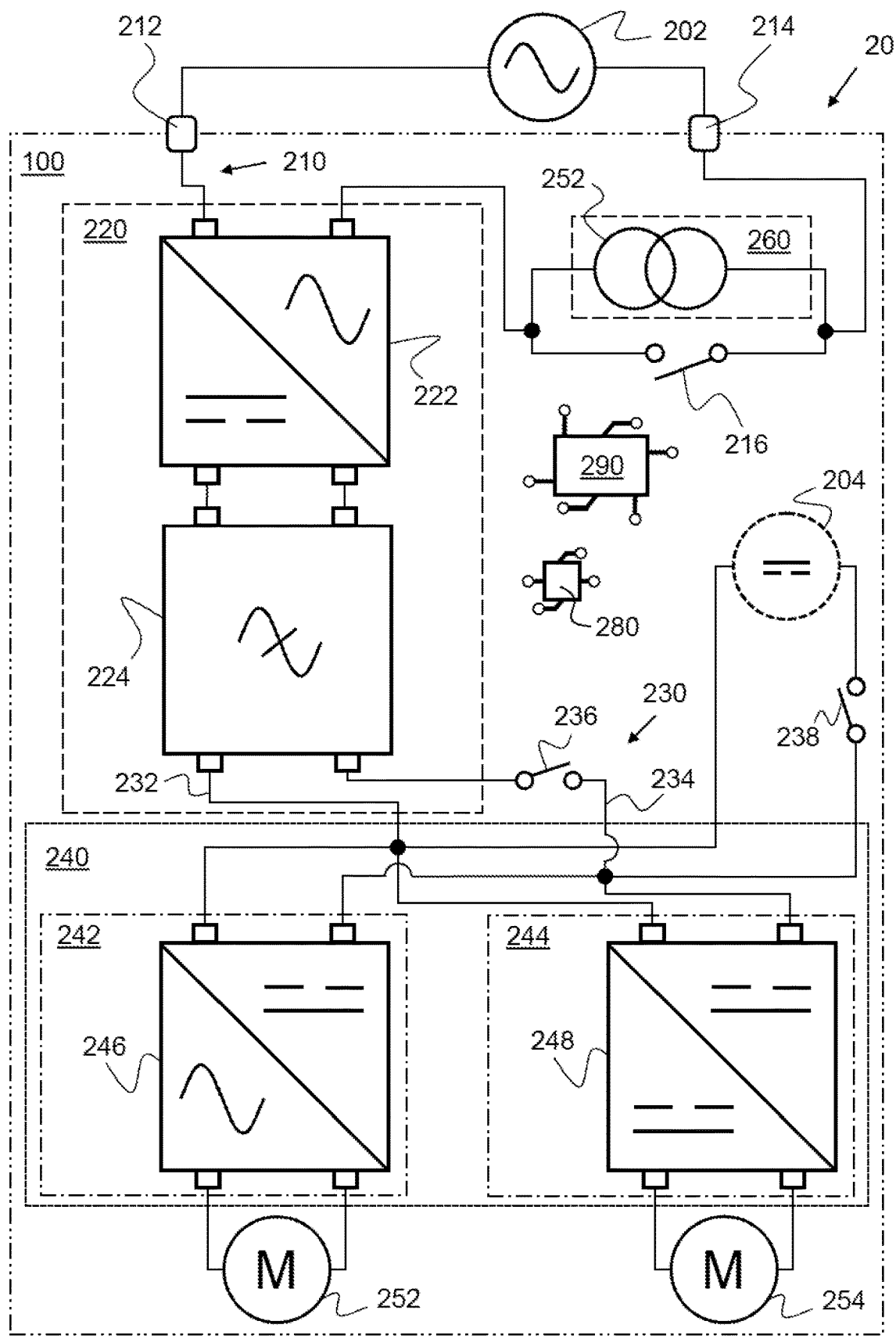
FIG. 2 shows an example electrical apparatus for the transport refrigeration system of FIG. 1.

FIG. 2 diagrammatically shows an example electrical apparatus 100 suitable for use with the transport refrigeration system 20 of FIG. 1. The electrical apparatus 100 comprises an AC power module (ACPM) 220, a DC bus 230, an active pre-charge circuit 260 and a control system 290.

The AC power module 220 is electrically couplable to an external AC power supply 202 via an AC bus 210. The active pre-charge circuit 260 may be internal to the AC power module 220, such that the AC power module 220 comprises the active pre-charge circuit 260. The AC power module 220 comprises a rectifier system 222 and a filter 224. The rectifier system 222 is generally configured to convert an alternating current received from the AC bus 210 (e.g. from the external AC power supply 202) through an input of the rectifier system 222 into a direct current which is then supplied to the DC bus 230 via the filter 224 through an output of the rectifier system 222. To this end, the rectifier system 222 may comprise at least one power switching component and/or diode, as will be appreciated by those skilled in the art.

The filter 224 is configured to reduce ripple in the direct current supplied from the output of the rectifier system 222. For this purpose, the filter 224 comprises at least one capacitive element (e.g. a capacitor) and may optionally further comprise an inductive element (e.g. an inductor) in any suitable topology or arrangement, as will be understood by those skilled in the art. The DC bus 230 is configured to electrically couple the AC power module 220 to a core power module 240 comprising at least one DC electrical component.

In the example of FIG. 2, the core power module 240 comprises two DC electrical components: a first DC electrical component 242 and a second DC electrical component 244. The first DC electrical component 242 includes an inverter system 246 and the second DC electrical component 244 includes a DC-DC converter system 248. The inverter system 246 is electrically coupled to an AC electrical load 252 whereas the DC-DC converter system 248 is electrically coupled to a DC electrical load 254. By way of example, the AC electrical load 252 may be an AC motor which is configured to drive a mechanical load of the transport refrigeration system 20. Similarly, the DC electrical load 254 may be an DC motor which is configured to drive a mechanical load of the transport refrigeration system. The mechanical load of the transport refrigeration system 20 may be, for instance, a compressor, a pump or a fan of the TRU 110.

The electrical apparatus 100 is electrically couplable to the external AC power supply 202 at an external connection port to which an external electrical cable can be connected. In FIG. 2, the external connection port is represented by a pair of external terminals 212 and 214 corresponding to "line" and "neutral" terminals, respectively, as will be understood by those skilled in the art. When an external electrical cable is connected to the external terminals 212, 214, the external AC power supply 202 may become available for driving the DC electrical components 242, 244 of the electrical apparatus 100 by means of the AC power module 220 and the core power module 240.

The inverter system 246 is generally configured to convert a direct current received from the DC bus 230 through an input of the inverter system 246 into an alternating current for supply to the AC electrical load 252 through an output of the inverter system 246. Accordingly, the inverter system 246 may comprise at least one power switching component and/or at least one reactive component. The DC-DC converter system 248 is generally configured to convert a direct current received from the DC bus 230 through an input of the DC-DC converter system 248 at a first voltage magnitude into a direct current for supply to the DC electrical load 254 through an output of the DC-DC converter system 248 at a second voltage magnitude, wherein the first voltage magnitude corresponds to an operating voltage (or nominal voltage) of the DC bus 230 and the second voltage magnitude corresponds to an operating voltage (or rated voltage) of the DC electrical load 254.

The second voltage magnitude may be lower than the first voltage magnitude, such that the DC-DC converter system 248 may be referred to as a buck converter system. This may be the case if, for example, the DC electrical load 254 is a DC motor which is configured to drive a fan of the transport refrigeration system 20. If so, the operating voltage (or rated voltage) of the DC electrical load 254 may be lower than the operating voltage (or nominal voltage) of the DC bus 230.

Optionally, the operating voltage of the DC bus 230 may be chosen as being equal to an operating voltage of an electrical system of a vehicle 10 in which the transport refrigeration system 20 is incorporated. This enables the DC bus 230 to be directly electrically coupled to the electrical system of the vehicle 10. In particular, the electrical system of the vehicle 10 may include a DC power supply 204 such as an electrical energy storage device (e.g. a medium voltage battery pack or a high-voltage battery pack). Typically, the operating voltage of the electrical system of the vehicle 10 may lie in a range between 400 VDC and 800 VDC. Consequently, the operating voltage of the DC bus 230 may be in a range between 400 VDC and 800 VDC.

The DC power supply 204 may be selectively couplable to the DC bus 230 (e.g. via a DC contactor 238) for driving the DC electrical components 242, 244 of the core power module 240. Accordingly, the DC power supply 204 may be described as being selectively couplable to the core power module 240, e.g. via the DC contactor 238. The DC power supply 204 may be used for this purpose when, for example, the external AC power supply 202 is not available for driving the DC electrical components 242, 244 of the electrical apparatus 100 (e.g. when the transport refrigeration system 20 is in transit or, more generally, when the external AC power supply 202 is not connected to the electrical apparatus 100 at the external terminals 212, 214).

The pre-charge circuit 260 is generally configured to provide a pre-charging current to the DC bus 230. To this end, the pre-charge circuit 260 in this example comprises a controllable current source 262 with voltage feedback. As can be seen from FIG. 2, the pre-charge circuit 260 is disposed on the AC bus 210 and is electrically coupled to the input of the rectifier system 222. Accordingly, in the example of FIG. 2, the pre-charge circuit 260 is configured to provide an AC pre-charging current to the input of the rectifier system 222. In other words, the pre-charge circuit 260 is configured to indirectly provide the pre-charging current to the DC bus 230 via the rectifier system 222. The pre-charge circuit 260 may be configured to receive electrical power for operation from the external AC power supply 202 when coupled to the electrical apparatus 100 at the external terminals 212, 214.

The control system 290 is adapted to control the electrical apparatus 100 in accordance with the various example methods described herein, and in particular the example method described below with reference to FIG. 3. The control system 290 may be configured to receive electrical power for controlling the electrical apparatus 100 from the electrical system of the vehicle 10.

A monitoring arrangement 280 is provided to the control system 290 for monitoring a voltage of the DC bus 230. The DC bus 230 comprises a first DC conductor 232 and a second DC conductor 234. The voltage of the DC bus 230 monitored by the monitoring arrangement 280 may be a potential difference between the first conductor 232 and the second conductor 234.

The DC bus 230 may include at least one DC contactor 236 for selectively coupling and decoupling the AC power module 220 to the core power module 240. The at least one DC contactor 236 may be internal to the AC power module 220, such that the AC power module 220 comprises the at least one DC contactor 236. In the example of FIG. 2, the DC contactor 236 is provided to the second DC conductor 234. However, in other examples, the DC contactor 236 may be provided to the first DC conductor 232. In further examples, a respective DC contactor may be disposed on each of the first and second DC conductors 232, 234 for selectively coupling and decoupling the AC power module 220 to the core power module 240. The at least one DC contactor 236 enables the AC power module 220 to be electrically isolated from the core power module 240 when appropriate. For instance, as discussed above, the DC bus 230 may be electrically coupled to the electrical system of a vehicle 10 in which the electrical apparatus 100 is incorporated. The at least one DC contactor 236 permits the AC power module 220 to be electrically isolated from the core power module 240 and the electrical system of the vehicle 10 when the DC power supply 204 is electrically coupled to the DC bus 230 the DC contactor 238 for driving the DC electrical components 242, 244 of the core power module 240.

It will be understood that this disclosure anticipates that the core power module 240 may comprise fewer than two DC electrical components or greater than two DC electrical components. For example, the core power module 240 may comprise only the first DC electrical component 242 referred to herein or only the second load 244 as referred to herein. In addition, this disclosure anticipates that the DC electrical components may include suitable systems or components other than those specifically referred to herein but which will be apparent to those skilled in the art.

Additionally, although it has been described that the pre-charge circuit 260 is disposed on the AC bus 210 and is therefore configured to indirectly provide the pre-charging current to the DC bus 230 via the rectifier system 222, this need not necessarily be the case. In particular, this disclosure envisages that the pre-charge circuit 260 may be disposed on the DC bus 230 and is therefore configured to directly provide the pre-charging current directly to the DC bus 230.

Figure 3:
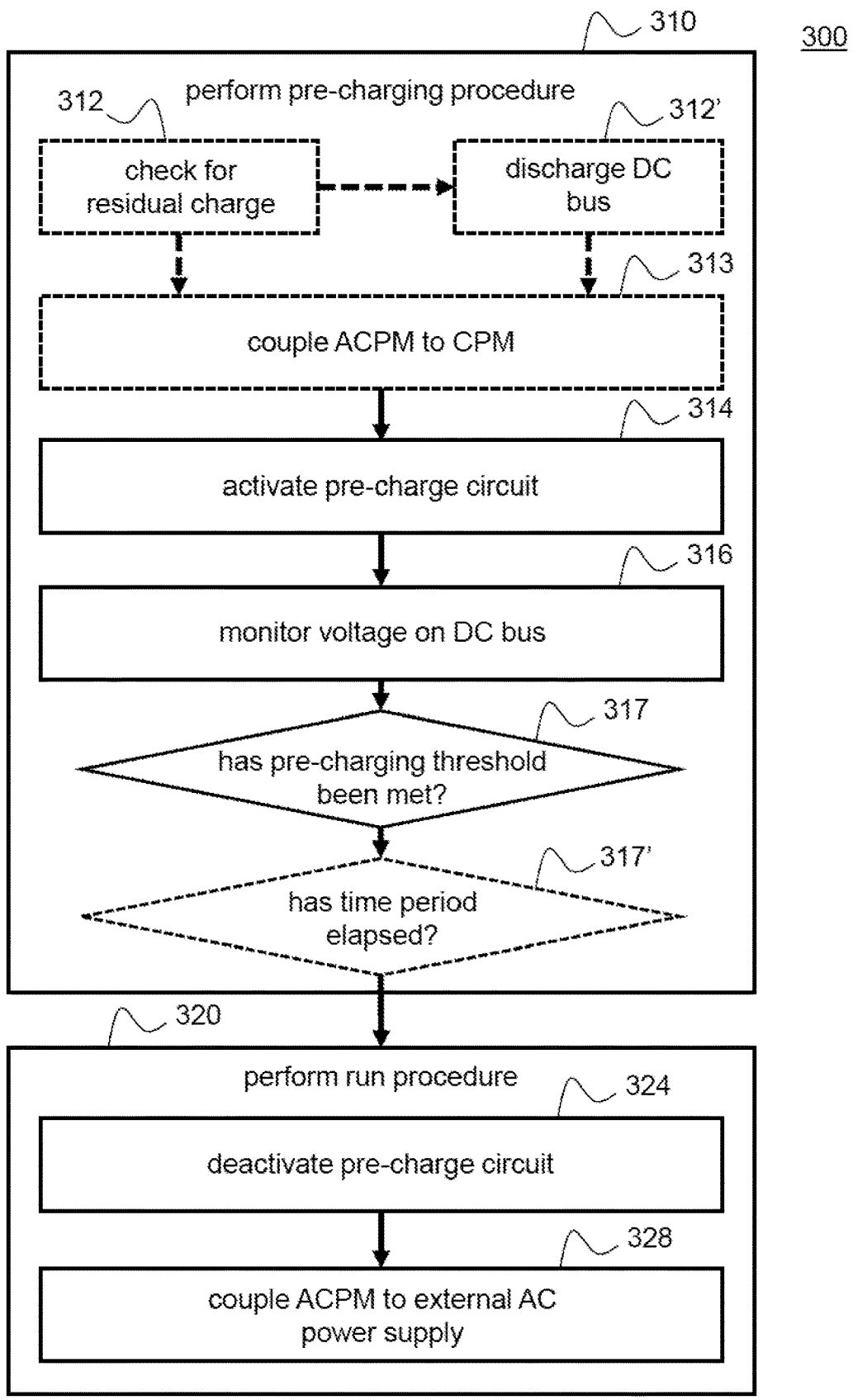
FIG. 3 shows an example method of controlling the electrical apparatus of FIG. 2.

FIG. 3 is a flowchart which shows an example method 300 of controlling the electrical apparatus 100 described above with respect to FIG. 2. The method 300 may be executed by the control system 290 shown by FIG. 2.

The method includes, at block 310, performing a pre-charging procedure for pre-charging the DC bus 230. The pre-charging procedure is performed in response to receipt of a pre-charge initiation signal. The pre-charging initiation signal is indicative of the external AC power supply 202 being coupled to the electrical apparatus 100 (e.g. at the external terminals 212, 214) and being available for driving the DC electrical components 242, 244. Accordingly, the pre-charge signal may be received by the control system 290 from a dedicated system for monitoring the external connection port and/or the status of the external AC power supply. More specifically, it may be that the pre-charge initiation signal is received by the control system 290 from a control system of the transport refrigeration system 20. Alternatively, it may be that the pre-charge initiation signal is received by the control system 290 from a control system of the TRU 110, which has in turn received a signal indicating that the external AC power supply 202 is connected to the electrical apparatus 100 at the external terminals 212, 214 and has determined to drive the mechanical load of the transport refrigeration system 20 (e.g. a compressor, a pump or a fan of the TRU 110) using electrical power from the external AC power supply 202.

The pre-charging current provided to the DC bus 230 by the pre-charge circuit 260 is for simultaneously pre-charging both the AC power module 220 and the core power module 240. If the electrical apparatus 100 includes the contactor 236 on the DC bus 230, the method 300 may include, as represented by block 313, coupling the AC power module 220 to the core power module 240 using, for example, the DC contactor 236. This ensures that the pre-charging current which is provided to the DC bus 230 has the effect of pre-charging both the AC power module 220 and the core power module 240 simultaneously.

The method 300 includes, at block 314, activating the pre-charge circuit 260 to provide the pre-charging current to the DC bus 230 as described above with reference to FIG. 2. In addition, the method 300 includes, at block 316, monitoring the voltage on the DC bus 230. Monitoring the voltage of the DC bus may be carried out using the monitoring arrangement 280 described above with reference to FIG. 2. Consequently, the monitored voltage of the DC bus 230 may be the potential difference between the first conductor 232 and the second conductor 234 of the DC bus 230. Alternatively, the monitored voltage of the DC bus 230 may a potential difference between either of the conductors 232, 234 of the DC bus 230 and a reference point (e.g. ground or earth).

It will be appreciated that the actions represented by blocks 314 and 316 may generally be executed simultaneously during performance of the pre-charging procedure. In particular, activating the pre-charge circuit to provide the pre-charging current to the DC bus 230 at block 314 may include controlling the pre-charge circuit 260 based on the voltage on the DC bus as monitored at block 316.

The pre-charging current supplied by the active pre-charge circuit 260 may be dependent upon a reference voltage, such that the greater the magnitude of the reference voltage the greater the pre-charging current, and vice-versa. By way of example, the reference voltage may be the monitored voltage of the DC bus 230. As a result, when the reference voltage is relatively small, the pre-charging current provided to the DC bus 230 is relatively small. Conversely, when the reference voltage is relatively large, the pre-charging current provided to the DC bus 230 is relatively large. Therefore, the pre-charge circuit 260 increases the pre-charging current provided to the DC bus 230 in response to an increase in the reference voltage. In this way, the pre-charge circuit 260 functions in an opposite manner to a passive resistor. As a consequence, an energy dissipated within the electrical apparatus 100 during performance of the pre-charging procedure at block 310 is lower than if a passive resistor were used in place of the pre-charge circuit 260. Therefore, an energy efficiency of the electrical apparatus 100 may be relatively increased by using the example methods described herein. In addition, a duration of the pre-charging procedure may be optimised (e.g. reduced) as a result.

The method 300 further includes, at block 317, comparing the monitored voltage on the DC bus 230 to a pre-charging threshold. If it is determined that the monitored voltage on the DC bus 230 has not reached (e.g. is less than) the pre-charging threshold, the method 300 comprises continuing to perform the pre-charging procedure. That is, the pre-charge circuit 260 continues to provide the pre-charging current to the DC bus 230 and the monitoring arrangement 280 continues to monitor the voltage of the DC bus 230. On the other hand, if it is determined that the monitored voltage of the DC bus 230 has reached (e.g. is equal to or greater than) the pre-charging threshold, the method 300 may directly proceed to performing a run procedure represented by block 320. Otherwise, if the method 300 comprises block 317' described below, the method 300 may first proceed to block 317'.

The pre-charging threshold is chosen as being a voltage of the DC bus 230 which is indicative that the internal components of the AC power module 220 and the core power module 240 have been sufficiently pre-charged to allow the AC power module 220 to be coupled to the external AC power supply 202 without a significant risk of a current surge within the electrical apparatus 100. Because the monitored voltage on the DC bus 230 is compared to the pre-charging threshold, the pre-charging threshold having been met corresponds to the internal components of both the AC power module 220 and the core power module 240 having been sufficiently pre-charged for safe coupling of the external AC power supply 202 to the AC power module 220 without a risk of significant current surge. The electrical characteristics of the internal components of the AC power module 220 and the core power module 240 are such that if they were not sufficiently pre-charged, the risk of a current surge developing after the external AC power supply 202 is connected to the AC power module 220 is significant. The capacitive element of the filter 224 may be particularly associated with an increased risk of a current surge in the electrical apparatus 100 and, more specifically, with an increased risk of a large magnitude current surge which may cause damage to the electrical apparatus 100.

The pre-charging threshold may be between 70% and 90% of the operating voltage of the DC bus 230. Preferably, the pre-charging threshold may be between 75% and 85% of the operating voltage of the DC bus 230 or, more preferably, approximately 80% of the operating voltage of the DC bus 230.

If a short-circuit fault is present on the DC bus 230 or within the core power module 240, the monitored voltage on the DC bus 230 will not rise to reach the pre-charging threshold. Accordingly, the method 300 will not proceed to the performing the run procedure at block 320 if a short-circuit fault is present on the DC bus 230 or within the core power module 240 for improved safety of the electrical apparatus 100. A pre-charging threshold of less than 100% of the operating voltage of the DC bus 230 ensures that small errors (e.g. instrumentation errors) in the monitored voltage on the DC bus 230 or small faults in the electrical apparatus 100 do not prevent the method 300 from moving to performing the run procedure at block 320, thereby improving a reliability of the electrical apparatus 100.

Nevertheless, in some examples, the method 300 includes block 317', which in turn comprises determining whether a pre-determined time period has elapsed since the monitored voltage on the DC bus 230 was determined to have reached the pre-charging threshold at block 317. If it is determined that the pre-determined time period has elapsed since the monitored voltage on the DC bus 230 was determined to have reached the pre-charging threshold at block 317, the method 300 proceeds to performing the run procedure at block 320. In other words, block 317' imposes a time delay on the method 300 proceeding to performing the run procedure at block 320 after it is determined that the monitored voltage on the DC bus 230 is determined to have reached the pre-charging threshold. This time delay may enable further pre-charging of the DC bus 230 to occur before the method continues to perform the run procedure at block 320. In conjunction with a pre-charging threshold of less than 100% of the operating voltage of the DC bus 230, the time delay prior to proceeding to the run procedure at block 320 may reduce an amount of time which is spent performing the pre-charging procedure in block 310, while still ensuring that the AC power module 220 and the core power module 240 are sufficiently pre-charged before the AC power module 220 is coupled to the external AC power supply 202. This may enable more flexible operation of the electrical apparatus 100.

The pre-charging procedure may also include block 312, which represents a step of checking for residual charge on the DC bus 230. The actions represented by block 312 may generally be executed prior to (e.g. chronologically before) the actions represented by blocks 314 and 316 during performance of the pre-charging procedure, such that if the method includes block 312, the DC bus 230 is checked for any residual charge before the pre-charge circuit 260 is activated to provide the pre-charging current to the DC bus 230. Checking for residual charge on the DC bus 230 may be carried out by the control system 290 using the monitoring system 280 by comparing the monitored voltage on the DC bus 230 to a residual charge threshold. The residual charge threshold may be between 0% and 10% of the operating voltage of the DC bus 230. If the monitored voltage on the DC bus 230 is greater than the residual charge threshold, it may be determined that residual charge is present. Otherwise, if the monitored voltage on the DC bus 230 is equal to or less than the residual charge threshold, it may be determined that residual charge is not present.

If there is any residual charge on the DC bus 230, the pre-charging procedure may then proceed to block 312', which comprises discharging the DC bus 230. Discharging the DC bus 230 has the effect of discharging, for example, the capacitive element of the filter 224 which is coupled to the DC bus 230. The DC bus 320 may be discharged by any suitable means, as will be apparent to those skilled in the art. For instance, the DC bus 230 may be discharged by connecting the first DC conductor 232 to the second DC conductor 234 through, for instance, a resistor, by closing an appropriate switch (not shown). After the DC bus 232 has been discharged, the switch may be opened such that the DC conductors 232, 234 are no longer connected through the resistor. Alternatively, the DC bus 230 may be discharged by activating a dedicated active discharging circuit which generally functions in an opposite manner to the active pre-charging circuit 260 described herein. This may reduce power losses within the electrical apparatus 100 compared to discharging the DC bus 230 through a resistor as described above. Like the actions represented by block 312, the actions represented by block 312' may generally be executed prior to (e.g. chronologically before) the actions represented by blocks 314 and 316 during performance of the pre-charging procedure. Discharging the DC bus 230 ensures that no residual charge remains on the DC bus 230 at a time the DC contactor 236 is closed to couple the AC power module 220 to the core power module 240 (at block 313). Therefore, the voltage on the DC bus 230 (e.g. on the second DC conductor 234) between the DC contactor 236 and the filter 224 and the voltage on the DC bus 230 (e.g. on the second DC conductor 234) between the DC contactor 236 and the core power module 240 is substantially equal when the DC contactor 236 is closed. Accordingly, a risk of a current surge, an arc flash or an arc blast as the DC contactor 236 closes is reduced.

The method 300 further includes, at block 320, performing a run procedure. The run procedure includes, at block 324, deactivating the pre-charge circuit 260 so that the pre-charging current is no longer provided to the DC bus 230 by the pre-charge circuit. The method 300 then includes, at block 328, electrically coupling the AC power module 220 to the external AC power supply 202 via the AC bus 210. This may be achieved by, for instance, closing an AC contactor 216 on the AC bus 210 (see FIG. 2). The AC power module 220 may then continually receive electrical power from the external AC power supply 202 for driving the DC electrical components 242, 244 of the electrical apparatus 100 via the core power module 240.

For execution of the method 300, the control system 290 may actuate the switches/contactors 216, 236, 238 of the electrical apparatus 100 as described above by means of electromagnetic relays, solid state relays, thyristors, transistors and other suitable actuators, as will be apparent to those skilled in the art.

The example methods of controlling the electrical apparatus 100 described herein are sufficiently simple and robust that they may be executed by a control system 290 which does not include, for instance, a microprocessor. Instead, the control system 290 may be a non-programmable hardware based control circuit such as a printed circuit board.

In addition, use of the pre-charging circuit 260 to provide the pre-charging current to the DC bus 230 according to the method 300 reduces a rate of heat dissipation within the electrical apparatus 100 compared to, for example, a previously-considered electrical apparatus which makes use of a passive resistor to limit the initial current drawn from an external AC power supply by the electrical apparatus for the purpose of current surge prevention and/or mitigation. This is associated with an increased energy efficiency of the electrical apparatus 100, as well as reducing or eliminating a need to include passive or active cooling features within the electrical apparatus 100 to remove and/or redistribute heat dissipated by the passive resistor in use. In turn, these benefits are associated with a reduced installation size and/or mass of the electrical apparatus 100.

Nevertheless, this disclosure envisages that the control system 290 may include a controller comprising a processor (e.g. a microprocessor). The controller and/or the processor may comprise any suitable circuitry to cause performance of the methods described herein and as illustrated in the drawings. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and or stated functions for which the controller or processor is configured.

The controller or the processor may comprise or be in communication with one or more memories that store that data described herein, and/or that store machine readable instructions (e.g. software) for performing the processes and functions described herein (e.g. determinations of parameters and execution of control routines). The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware or be a combination of software and firmware.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

The invention claimed is:

1. An electrical apparatus comprising:
an AC power module including a rectifier system;
a DC bus configured to electrically couple the AC power module to a core power module including at least one DC electrical component;
a pre-charge circuit; and
a control system,
wherein the control system is configured to:
responsive to a pre-charge initiation signal, perform a pre-charging procedure for pre-charging the DC bus, the pre-charging procedure including:
activating the pre-charge circuit to provide a pre-charging current to the DC bus;
monitoring a voltage on the DC bus; and
responsive to a determination that the monitored voltage on the DC bus has
reached a pre-charging threshold, perform a run procedure including:
deactivating the pre-charge circuit; and
electrically coupling the AC power module to an external AC power supply via an AC bus.

2. The electrical apparatus of claim 1, wherein the pre-charging current provided to the DC bus is for simultaneously pre-charging the AC power module and the core power module.

3. The electrical apparatus of claim 1, wherein the pre-charge circuit comprises a controllable current source.

4. The electrical apparatus of claim 1, wherein the pre-charging procedure further comprises checking for residual charge on the DC bus and discharging the DC bus if there is any residual charge on the DC bus before activating the pre-charge circuit to provide the pre-charging current to the DC bus.

5. The electrical apparatus of claim 1, wherein the monitored voltage on the DC bus is a potential difference between a first conductor of the DC bus and a second conductor of the DC bus.

6. The electrical apparatus of claim 1, wherein the AC power module comprises a filter including a capacitor.

7. The electrical apparatus of claim 1, wherein the control system is configured to:
perform the run procedure responsive to:
a determination that the monitored voltage on the DC bus has reached the pre-charging threshold; and
a determination that a pre-determined time period has elapsed since the monitored voltage on the DC bus was determined to have reached the pre-charging threshold.

8. The electrical apparatus of claim 1, wherein the pre-charging threshold is between 70% and 90% of an operating voltage of the DC bus.

9. The electrical apparatus of claim 8, wherein the operating voltage of the DC bus is between 400 V and 800 V.

10. The electrical apparatus of claim 9, wherein the pre-charge circuit providing the pre-charging current to the DC bus based on the reference voltage includes the pre-charge circuit increasing the pre-charging current provided to the DC bus in response to an increase in the reference voltage.

11. The electrical apparatus of claim 1, wherein activating the pre-charge circuit to provide the pre-charging current to the DC bus includes the pre-charge circuit providing the pre-charging current to the DC bus based on a reference voltage, and wherein the reference voltage is:
the monitored voltage on the DC bus.

12. The electrical apparatus of claim 1, further comprising the core power module, and wherein the at least one DC electrical component includes an inverter system.

13. A transport refrigeration system comprising the electrical apparatus of claim 12, wherein:
the inverter system is electrically coupled to at least one AC electrical load; and
the at least one AC electrical load is an AC motor which is configured to drive a compressor, a pump or a fan of the transport refrigeration system.

14. The electrical apparatus of claim 1, further comprising the core power module, and wherein the at least one DC electrical component includes a DC-DC converter system.

15. A transport refrigeration system comprising the electrical apparatus of claim 14, wherein:
the DC-DC converter system is electrically coupled to at least one DC electrical load; and
the at least one DC electrical load is a DC motor which is configured to drive a compressor, a fan or a pump of the transport refrigeration system.

* * * * *